(12) United States Patent
Leden et al.

(10) Patent No.: US 7,469,913 B2
(45) Date of Patent: Dec. 30, 2008

(54) AXLE TOWER

(75) Inventors: Nathan Michael Leden, Lemont, IL (US); Richard Steven Holum, Shorewood, IL (US); Richard Gregory Vogler, Naperville, IL (US); Michael Brannigan, Narberth, PA (US); Ashley Thomas Dudding, Yorkville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 342 days.

(21) Appl. No.: 11/375,747

(22) Filed: Mar. 15, 2006

(65) Prior Publication Data
US 2006/0290090 A1   Dec. 28, 2006

Related U.S. Application Data

(60) Provisional application No. 60/662,233, filed on Mar. 16, 2005.

(51) Int. Cl.
*B60G 9/04* (2006.01)
(52) U.S. Cl. .............................. 280/124.107; 301/125; 280/124.156
(58) Field of Classification Search .......... 280/124.156, 280/124.116, 124.128, 676, 124.11, 124.111, 280/124.135, 124.107; 301/125, 137; 74/607; 180/349, 352
See application file for complete search history.

(56) References Cited

U.S. PATENT DOCUMENTS 5,112,078 A *   5/1992  Galazin et al. ........ 280/124.116
5,458,359 A *  10/1995  Brandt ................. 280/124.111
6,491,314 B2 * 12/2002  Smith et al. ........... 280/124.116
6,527,286 B2 *  3/2003  Keeler et al. .......... 280/124.135
6,793,225 B2 *  9/2004  Svartz et al. .......... 280/124.107

FOREIGN PATENT DOCUMENTS

EP          0 776 275 B1     5/1996

OTHER PUBLICATIONS

English-language translation of EP 0 776 275 B1.

* cited by examiner

*Primary Examiner*—Christopher Ellis
*Assistant Examiner*—Joseph Rocca
(74) *Attorney, Agent, or Firm*—Cook Alex Ltd.

(57) ABSTRACT

The invention is directed to vehicle suspension systems and components thereof including attachment devices for mounting an axle alignment and/or load reacting mechanism to an axle. Disclosed herein are axle towers used for connecting a torque box to an axle. The axle tower of the present invention can include one or more features to absorb and disperse loads to the axle. The axle tower has a more contoured or curved edge on the side plate that experiences a compressive force than a similar edge on the side plate that experiences a tensile force. Furthermore, the axle tower has appendages that extend out from the side plates providing a large footprint on the axle housing. At least one of the appendages extending from the side plate experiencing a compressive force has a curved or radiused corner. Also, the axle towers include an inner plate having an off-centered slot where the troque box connects. The off-centered slot provides additional material to absorb the compressive force experienced on one side of the inner plate.

20 Claims, 5 Drawing Sheets

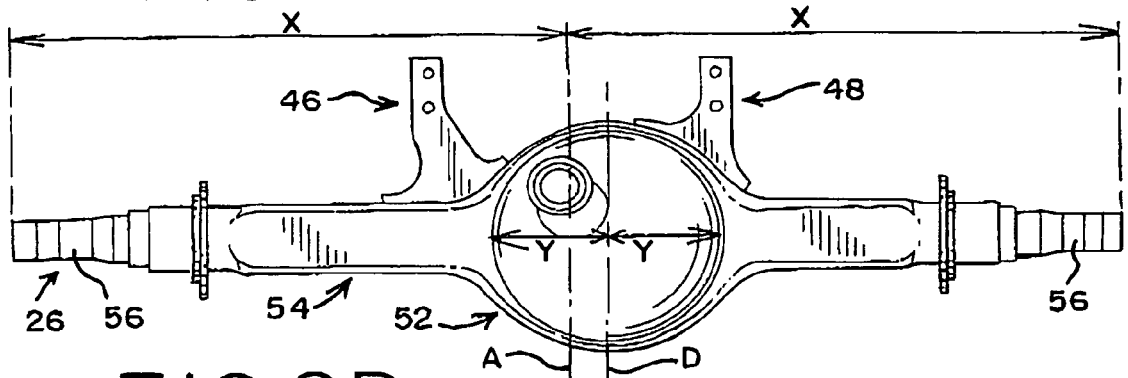
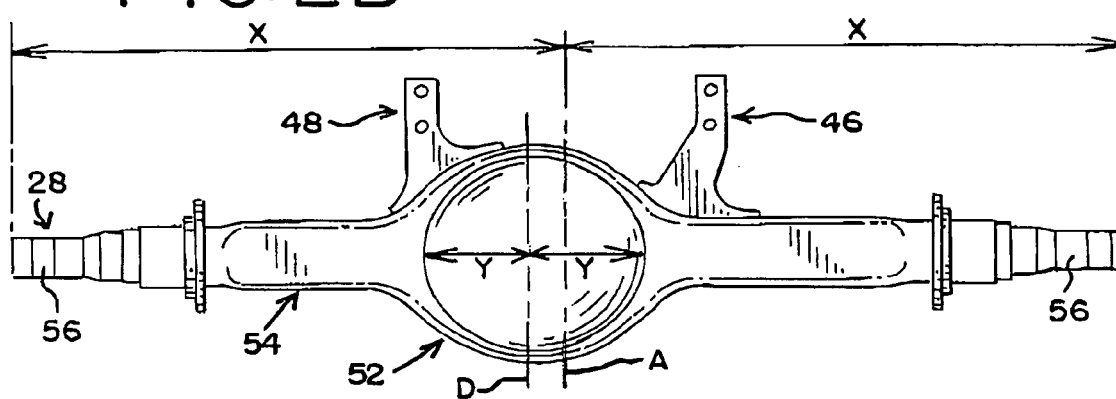
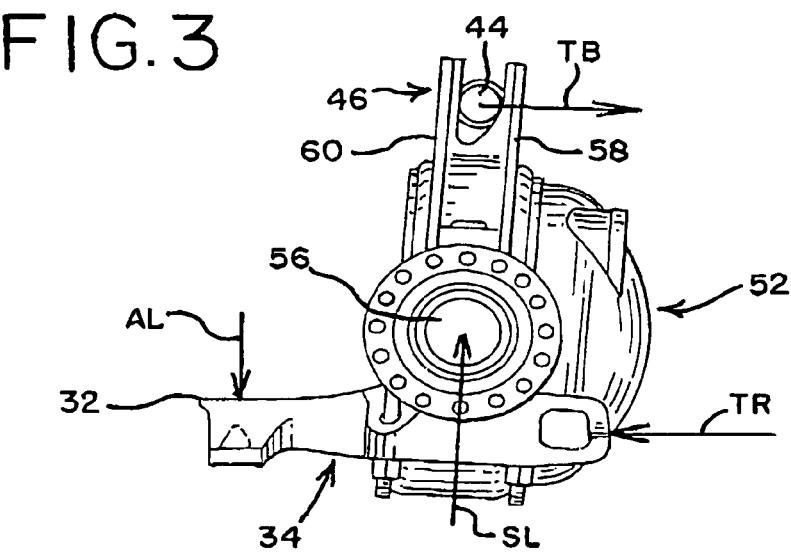

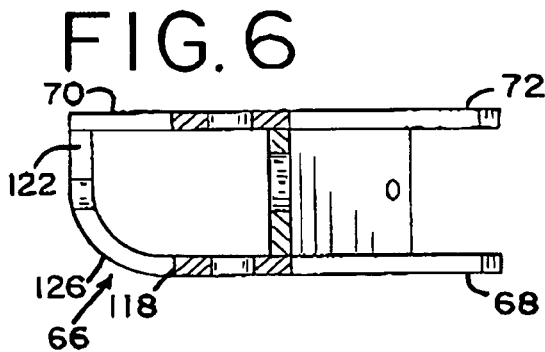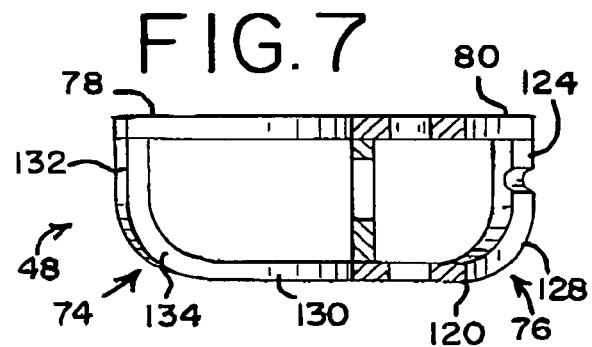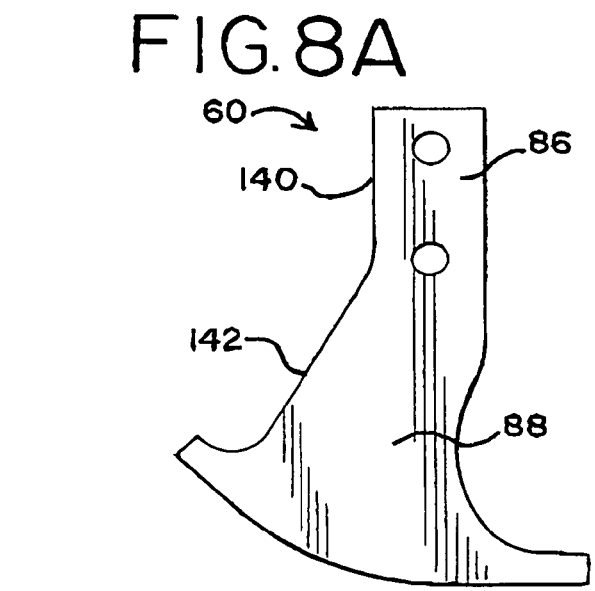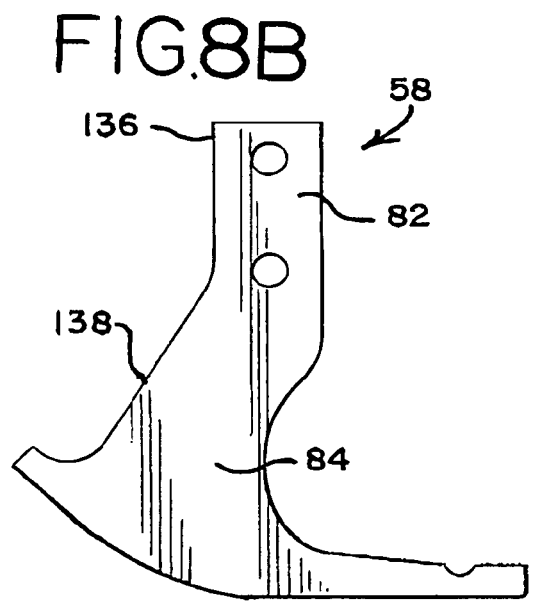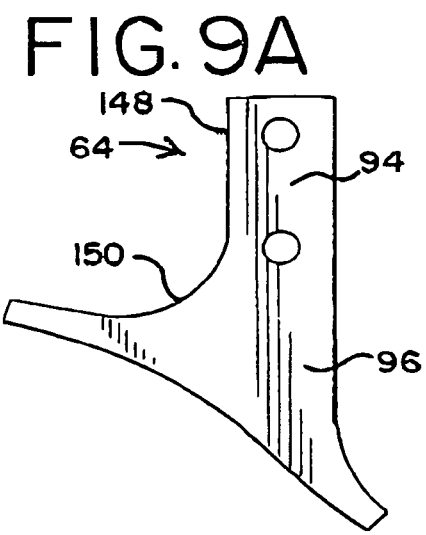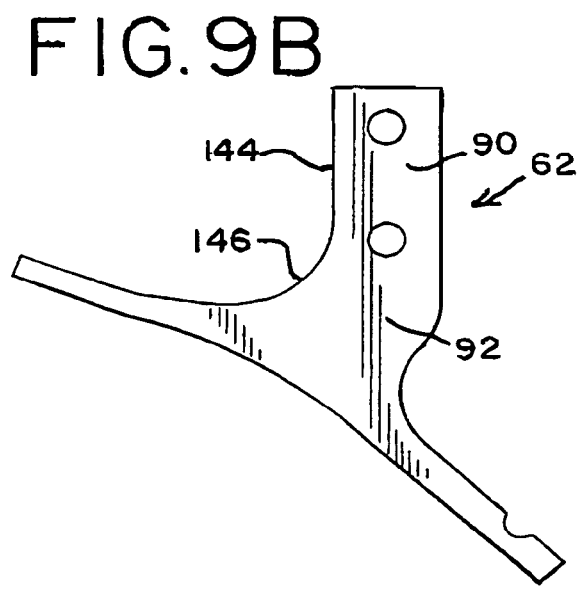

AXLE TOWER

This application claims the benefit of U.S. Provisional Application Ser. No. 60/662,233, filed Mar. 16, 2005.

BACKGROUND OF THE INVENTION

The present invention is directed to devices for attaching a suspension system component such as an axle alignment device and/or a load reacting mechanism to the axle housing. In particular, the present invention is directed to axle towers which attach a multifunctional axle aligning and/or load reacting device such as a torque box to the axle housing.

The suspension system of a vehicle provides a comfortable ride for the passenger(s) of the vehicle and protects cargo that the vehicle may be carrying from excessive vibration. Equally, if not more importantly, the suspension system also provides stability to the vehicle by controlling various forces acting on the axle which would otherwise cause an unwanted change in the position of the axle relative to the vehicle frame. Specifically, such forces operate to alter the vertical, lateral, and/or longitudinal position of the axle in relation to the vehicle frame and also can cause axle movement such as roll, yaw, and wind-up. Each of the components of the suspension system reacts and controls one or more of the forces. In order to reduce the complexity and weight of the suspension system, components of the suspension system are being designed to control multiple forces.

A torque box assembly is one such multifunctional component. It reacts to vertical air spring loads, resists braking/acceleration loads, acts as the core roll resisting feature, resists cornering or lateral loading and maintains axle location in relation to the frame rails and also helps to prevent undue yaw and axle wind-up.

In general, the torque box assembly typically comprises a welded steel rectangular box structure. The front and rear ends are welded to round steel tubes. Upon assembly, bonded rubber bushes are inserted into these tubes and round metal rods are placed in the bushings. On one end of the torque box, the rod is connected to a cross member which spans between the frame rails of the vehicle frame. On the opposite end of the torque box, each end of the inner round metal rod is in turn attached to an axle tower linking the torque box to the axle through the axle housing. Further details of a torque box assembly are disclosed in U.S. Pat. No. 6,527,286. The disclosure of U.S. Pat. No. 6,527,286 is incorporated herein by reference.

Clearly, the load path between the axle housing and the torque box is of major import. Attachment devices or axle towers as referred to herein are intended to provide a means of transferring these loads onto the axle housing. These axle towers transfer longitudinal, roll input, lateral and vertical loads. Preferably, the axle towers are capable of this load transfer without overloading and/or fracturing the axle housing.

Asymmetrical axles are the standard in North America. Asymmetrical refers to the fact that the differential housing is offset from the centerline of the axle. Asymmetrical axles present challenges in designing attachment devices that attach axle alignment devices and/or load reacting devices such as torque boxes to the axle housing. The torque box or other device is typically centered between the frame rails of a vehicle and accordingly centered between the opposite ends of the axle. In order to center the torque box or other device, the attachment devices such as axle towers are spaced apart an equal distance from the centerline of the axle. Consequently, since the differential housing is not centered on the axle, the axle towers are typically mounted to the differential housing at different distances from the either side of the centerline of the differential housing. In other words the axle towers are mounted at asymmetric points about the centerline of the differential housing such that a chord connecting the attachment points is not horizontal.

As such, axle towers are typically designed differently from each other to accommodate their asymmetric positioning about the differential housing. Besides having different base configurations due to accommodate the mounting position on the differential housing, the axle towers are also of differing heights in order to maintain the transverse extent of the torque box parallel to the axle at rest. In other words, since one axle tower may be placed at a more elevated position on the differential housing than the other axle tower, that elevated axle tower will shorter than the other axle tower otherwise the torque box will be skewed relative to the axle at rest.

The axle towers have to being able to withstand the stress forces exerted by the torque box or other such devices, the axle towers have to be able to absorb and/or disperse the forces along the axle housing in order to prevent possible failure of the axle and/or differential housings.

Other attachment devices known in the art are perhaps longitudinal and transverse torque rod towers encountered on most on highway suspensions or the tower which connects a "vee rod" to the top of the axle housing. However, these devices are not intended to be multifunctional in nature as is the case with the axle towers of the present invention. The axle towers of the present invention are unique in that they are multifaceted, multifunctional structural components, i.e. structures that react to loads on multiple axes, whereas existing devices are one dimensional in their function, i.e. structures that react to loads on a single axis. In order to provide the functions listed above, several features which are improvements over prior art structures can be included in the axle towers of the present invention.

As will be explained in more detail below, the torque box is in tension and reacts by pulling on the axle towers when a vertical load is applied to the air springs. Due to this cantilevered load into the axle towers, there is a compression side (closest to the torque box) and a tension side (furthest from the torque box) on the axle towers. These two sides of the axle towers therefore can be designed differently to provide an efficient design capable of carrying the loads.

In one embodiment of the axle towers of the present invention, the axle towers can include several features. While these features will be discussed in greater detail below, they are summarized as follows. One feature that may be included is that the compression side of the axle tower differs in shape from tension side of tower. The differing shapes affect the stiffness of each side of the tower and improve the stress distribution and reduce the stress load on the axle housing One difference in the shape in the tower sides is that the side of axle tower that experiences higher compression forces is scalloped or contoured to a greater extent than the other side or tension side of the axle tower.

Another feature that may be included is that slot of the internal connecting plate is asymmetrically shaped. The asymmetry addresses the concentration of stress on one side of the slot through the concentration of material to offset the higher stress level. In other words, there is more material on the side that experiences greater stress forces.

A further feature that can be included is an asymmetrical foot print attaching the axle towers to axle housing. The compression side of the axle tower or the side with the greater degree of cutout or curvature has at least one radiused or rounded corner. The rounded or radiused foot print radius on the compression side of the axle tower attenuates the effects of a sharp corner on the axle housing by distributing the stress load. In addition, the foot print has a sizable extent along the axle housing. This helps to disperse the stress along a larger area of the axle and differential housing.

Yet another feature that may be included is that the scalloping or contouring of the axle tower on the compression side allows it to flex and comply as the axle deforms under load without overloading attaching welds. A structure having no scalloping or contouring would be stiffer and would not flex as the axle distorts which could overload the welds Yet another feature may be weldment of the axle towers. Weldment is lighter, more cost efficient and may be preferable over common steel casting. In addition, weldment does not require subsequent machining as a casting would. However, the axle tower could be manufactured in casting form versus the fabrication described herein without departing from the scope of the invention. The axle towers of the present invention could also be altered to serve as torque rod attachments.

SUMMARY OF THE INVENTION

In one aspect of the present invention an axle tower is provided for attaching a vehicle suspension component to a vehicle axle having a centerline. The axle tower comprises a compression side plate disposed generally parallel to a tension side plate with each of the compression and tension side plates having upper and lower portions. Each of the upper and lower portions of the compression and tension side plates has a proximate edge positioned closer to the centerline than a distal edge. First and second appendages extend from the distal edges of the lower portions of the compression and tension side plates, respectively and third and fourth appendages extend from the proximate edges of the lower portions of the compression and tension side plates, respectively. The proximate and distal edges of the lower portions of the compression and tension side plates have an arcuate portion. An inner plate joins and is positioned perpendicular to the compression and tension side plates. The inner plate has upper and lower portions and the upper portion of the inner plate has a slot for attaching the axle tower to the vehicle suspension component.

In another aspect of the present invention, a mounting assembly is provided for mounting a suspension component to an asymmetrical axle that includes a differential housing having a centerline. The mounting assembly comprises first and second axle towers mounted to the asymmetrical axle on opposite sides of the centerline, respectively. The first and second axle towers each comprises compression and tension side plates disposed parallel to each other and each of the compression and tension side plates has upper and lower portions. Each of the upper and lower portions includes a proximate edge facing towards the centerline and a distal edge facing away from the centerline. First and second appendages extend from the distal edges of the lower portions of the compression and tension side plates, respectively, and third and fourth appendages extend from the proximate edges of the lower portions of the compression and tension side plates, respectively. An inner plate joins the compression and tension side plates and is positioned perpendicular to the compression and tension side plates. Each of the inner plates has a slot for attaching the first and second axle towers to the vehicle suspension component and each of the slots is spaced an equal distance from a center of the axle.

In yet another aspect of the invention, a suspension system for supporting a vehicle chassis that includes transversely spaced longitudinally extending first and second frame rails over a transversely extending axle that includes a centerline is provided. The suspension system comprises a cross member extending transversely between and connected to the first and second frame rails; and a multifunctional suspension component connected at one end to the cross member and connected at another end to first and second axle towers. The first and second axle towers are transversely spaced apart and fixed to the axle at opposite sides of the centerline. The first and second axle towers each comprises compression and tension side plates longitudinally spaced from and parallel to each other. Each of the compression and tension side plates has upper and lower portions and each of the upper and lower portions has a proximate edge facing towards the centerline and a distal edge facing away from the centerline. First and second appendages extend from the distal edges of the lower portions of the compression and tension side plates, respectively and third and fourth appendages extend from the proximate edges of the lower portions of the compression and tension side plates, respectively. An inner plate joins the compression and tension side plates and is positioned perpendicular to the compression and tension side plates. Each of the inner plates has a slot for attaching the first and second axle tower to the multifunctional suspension component. The slots of the first and second axle towers are equally spaced from the centerline.

BRIEF DESCRIPTION OF THE DRAWINGS

FIG. 2A is an elevation view of the leading arm asymmetrical axle of the tandem axle shown in FIG. 1 having two axle towers of the present invention mounted thereon.

FIG. 2B is an elevation view of the trailing arm asymmetrical axle of the tandem axle shown in FIG. 1 having two axle towers of the present invention mounted thereon.

FIG. 3 is a side elevation view of the leading arm axle shown in FIG. 2A.

FIG. 6 is a cross-sectional view taken at line 6-6 of FIG. 5A.

FIG. 7 is a cross-sectional view taken at line 7-7 of FIG. 5B.

FIG. 8A is an elevation view of the side plate of the axle tower shown in 5A that experiences tension.

FIG. 8B is an elevation view of the side plate of the axle tower shown in 5A that experiences compression and having an unbent appendage.

FIG. 9A is an elevation view of the side plate of the axle tower shown in 5B that experiences tension.

FIG. 9B is an elevation view of the side plate of the axle tower shown in 5B that experiences compression and having an unbent appendage.

DETAILED DESCRIPTION OF THE INVENTION

Before describing the embodiments of the axle tower of the present invention a general description of a suspension system, vehicle axle and frame will be provided. The axle towers of the present invention can be used with other suspension systems, vehicle axles and frames without affecting the overall concept of the present invention.

Figure 1:
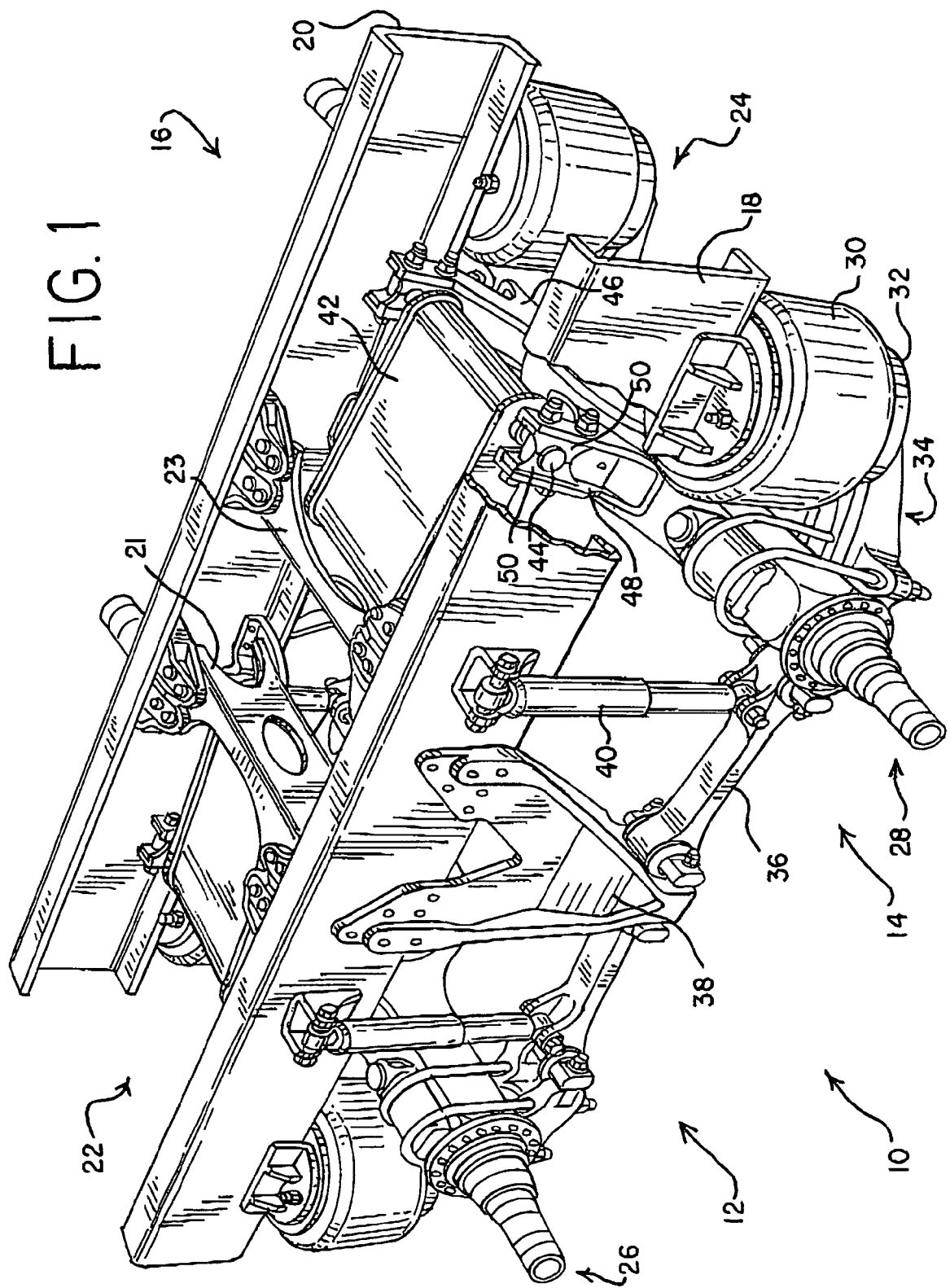
FIG. 1 is a perspective view of a suspension system of the present invention mounting a vehicle frame over a tandem axle.

A tandem axle, vehicle suspension system and vehicle frame indicated generally at 10 is shown in FIG. 1. Each axle incorporates the axle towers of the present invention. Axle and suspension system 12 is a leading arm axle type and 14 is a trailing arm type. Each axle and suspension system 12, 14 is shown mounted on a frame 16 which includes longitudinally extending frame rails 18, 20. Frame rails 18, 20 are rigidly connected by a pair of longitudinally spaced apart, transversely extending and parallel cross members 21, 23. The cross members 21, 23 can be connected by any suitable means to each frame rail 18, 20 and typically with mounting brackets.

Leading arm suspension system 22 and trailing arm suspension system 24 support frame 16 on axles 26, 28, respectively. Only the main components of the trailing arm suspension system 24 and which are duplicated on the leading arm suspension system 22 are briefly discussed. Air springs 30 are mounted on frame rails 18, 20 at their top ends and are connected at their bottom ends to pads 32 of axle seats 34. Axle seats 34 are attached to each end of axles 26, 28. On the end of each axle seat 34 opposite the pad 32, torque rods 36 are pivotally connected using a pin and bushing arrangement. The other end of the torque rods 36 is also pivotally connected with a pin and bushing arrangement to a V-shaped hanger 38 that is mounted to the frame rails 18, 20.

Shock absorbers 40 are attached at one end to the frame rail 18 through a bracket and pivotally connected at another end to torque rod 36. Torque box 42 is attached at one end to the frame rails 18, 20 via pivotal connections at both ends of the transversely extending rod (not shown) to the cross member 23. At the other end of the torque box 42, one end of the transversely extending rod 44 is connected to axle tower 46 and the other end of rod 44 is connected to axle tower 48. The rod 44 is sandwiched between clamp ends 50 and held in place with bolts. The rod may be connected to the axle tower by other means.

Figure 4A:
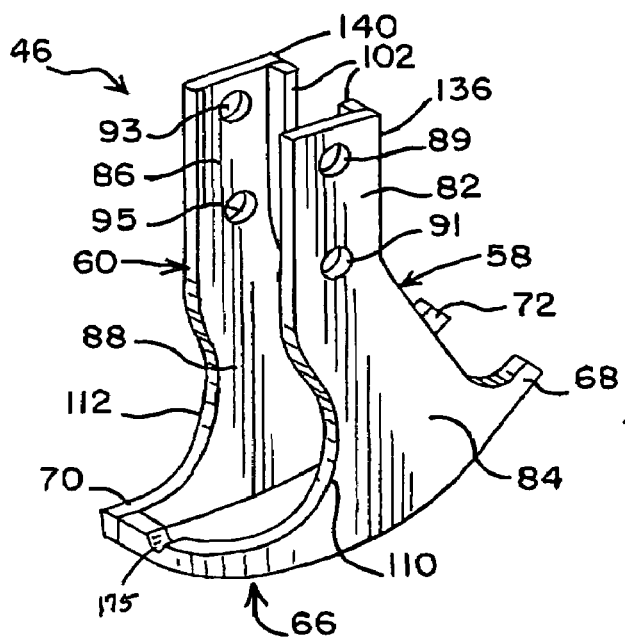
FIG. 4A is a perspective view of one embodiment of an axle tower of the present invention.
Figure 4B:
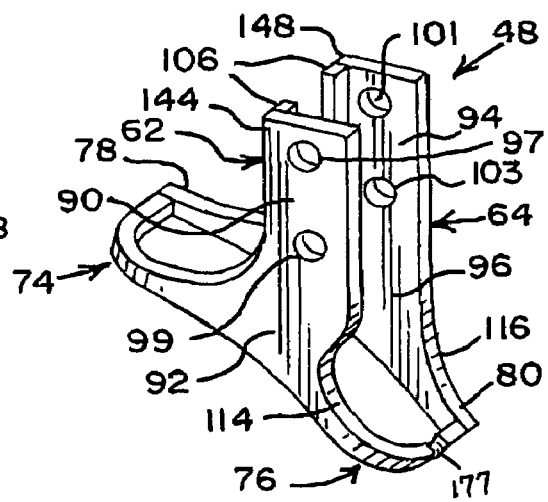
FIG. 4B is a perspective view of another embodiment of an axle tower of the present invention.

Axles 26, 28 shown in FIGS. 2A and 2B are nearly identical asymmetrical axles which are rotated 180° depending on their whether the axle is in a leading or trailing arm configuration. The axles are referred to as asymmetrical due to the fact that the differential housing portion 52 of each axle 26, 28 is offset from the centerline A of each axle 26, 28. Since the differential housing is offset from the centerline of the axle and since the alignment devices and/or load reacting devices are typically centered in relation to the axle, the axle towers 46, 48 are fixed to the axle housing 54 at asymmetric positions along the differential housing 52. In other words, axle tower 46 which is spaced further from the centerline D of the differential housing and has less of its footprint in contact with and is positioned lower on the differential housing 52 than axle tower 48 which is spaced closer to the centerline D and has more of its footprint in contact with and positioned higher on the differential housing 52. Due to this asymmetric positioning along the differential housing 52, axle towers 46, 48 as illustrated in FIGS. 4A and 4B may have different design configurations (besides the footprint or area contacting the housing) and heights in order to maintain the torque box mounting points horizontally aligned. However, it is not required that the axle towers have a different configuration especially if they are fixed to the axle housing without contacting the differential housing or if they are contacting the differential housing at symmetrical positions. Indeed, for symmetrical axles two axle towers could be utilized that are mirror images of each other; in particular axle tower 46 and a mirror image of axle tower 46 could be used to connect the torque box to a symmetrical axle.

FIG. 3 illustrates some of the forces/loads acting on the axle 26 and axle tower 46. Arrows AL represents the load applied by the air spring (not shown), SL represents the load applied by the spindle 56, TR represents the load applied by the torque rod (not shown), and TB represents the load applied by torque box (not shown). As illustrated in FIG. 3, the torque box (not shown) is in tension and applies a load in the direction of arrow TB. Accordingly, this load places the side plate 58 of axle tower 46, which is closer to the torque box, in compression and places side plate 60 of axle tower, which is further from the toque box, in tension.

Axle tower 46 includes a compression side plate 58 and tension side plate 60 and axle tower 48 includes compression side plate 62 and tension side plate 64 as shown in FIGS. 4A, 4B, 5A and 5B. Each side plate 58, 60, 62, 64 can have two appendages 66, 68, 70, 72, 74, 76, 78, 80, respectively and upper and lower portions 82, 84, 86, 88, 90, 92, 94, 96, respectively. Alternatively, instead of two appendages 66 and 70 intergrally formed with side plates 58, 60, a single appendage incorporating 66 and 70 could be welded to side plates 58, 60. This alternative construction can also be applied to appendages 74, 78 and 76, 80 and side plates 62, 64.

Side plates 58, 60 each have two openings 89, 91, 93, 95, respectively. Openings 89, 91 are concentric with openings 93, 95 respectively and used for attaching the rod 44 of torque box 42 to the axle tower 46. Side plates 62, 64 also have a pair of openings 97, 99, 101, 103 respectively and are arranged in the same manner for the same purpose.

The side plates 58, 60, 62, 64 may be connected by inner plate 98, 100, respectively. The inner plates 98, 100 also have upper and lower portions 102, 104, 106, 108, respectively. The side plates 58, 60, 62, 64 and inner plates 98, 100 may be constructed of a hardened and high strength material such as steel and can be welded together, this includes the welding of appendage 66 to appendage 70 and the welding of appendage 74 to 78. Alternatively, the entire axle tower structure could also be formed as a casting.

Lower portions 84, 88, 92, 96 have edges 110, 112, 114, 116, respectively that face away from the centerline A or towards the nearest spindle. As discussed above, side plates 58, 62 experience compressive forces applied by the torque box or other load reacting/axle alignment device while side plates 60, 64 experience tensile forces. In order to adequately absorb and disperse this compressive force, edges 110 and 114 may be contoured, or scalloped. Edges 112, 116 can also be contoured or have a curvature. It is also desirable that edges 110, 114 have a greater contour or scallop than edges 112, 116, respectively. In other words, edges 110, 114 are spaced closer to edges 138, 146 respectively, than are edges 112, 116 to edges 142, 150, respectively as shown in FIGS. 8A, 8B, 9A, and 9B.

Appendages 66 and 76 which extend from edges 110, 114, respectively, may curve toward side plates 60, 64, respectively and have radiused corners. As side plates 58, 62 experience compressive forces, these radiused corners reduce or spread the load on the axle and differential housings which would otherwise be concentrated with sharper corners. In addition, the radiused corners reduce the stress concentration to the welds attaching the axle towers to the axle housing.

As shown more clearly in FIGS. 6 and 7, appendages 66, 76 bend at about a 90° angle. In other words, first sections 118, 120 are oriented at about 90° to third sections 122, 124, respectively with curved second sections 126, 128 joining first sections 118, 120 and third sections 122, 124, respectively. The appendages 66, 76 can be long enough to meet and be welded to respective appendages 70, 80. Also, third sections 122, 124 may meet at about a 90° angle to appendage 70, 80 and that first sections 118, 120 extend parallel to appendages 70, 80. Indeed, appendages 66, 74 and 76 are shown in FIGS. 8B and 9B prior to applying the bend or curve.

Appendage 74 may also curve toward and have a length sufficient to meet be welded to appendage 78 since axle tower 48 is positioned higher on the differential housing and typically experiences higher stress in the area of appendages 74, 78. Appendage 74 also bends at about a 90° angle such that first section 130 is at about 90° to third section 132 with curved second section 134 joining the first and third sections 130, 132. Third section 132 may also meet appendage 78 at about a 90° angle and that first section 130 extends parallel to appendage 78. In addition, appendages 68 and 72 may extend parallel to each other as shown in FIG. 4A or can be connected to each other as described with the other pairs of appendages.

Upper and lower portions 82, 84, 86, 88 also have edges 136, 138, 140, 142 that face toward the centerline A as best shown in FIGS. 8A and 8B. Likewise, upper and lower portions 90, 92, 94, 96 have edges 144, 146, 148, 150 that face toward the centerline A. Edges 136, 140, 144, 148 may be substantially linear while edges 138, 142, 146, 150 have some curvature. The curvature or radius of curvature of edge 138 may be substantially the same as that of edge 142 and the curvature or radius of curvature of edge 146 may be substantially the same as that of edge 150.

Figure 5A:
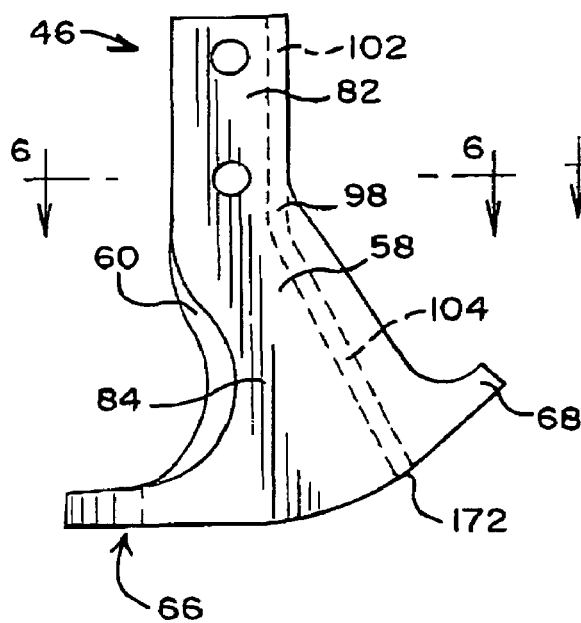
FIG. 5A is an elevation view of the axle tower shown in FIG. 4A.
Figure 5B:
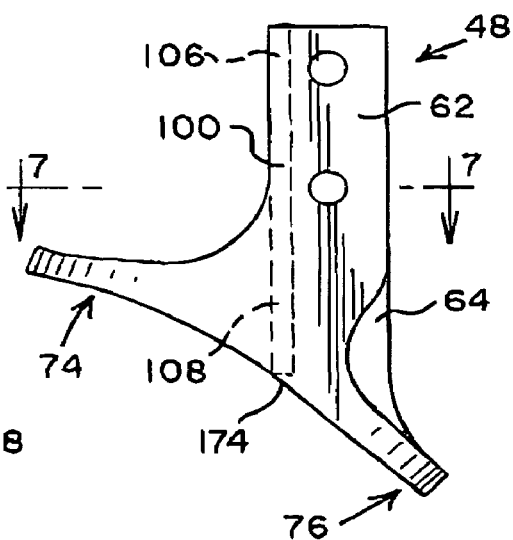
FIG. 5B is an elevation view of the axle tower shown in FIG. 4B.
Figure 10A:
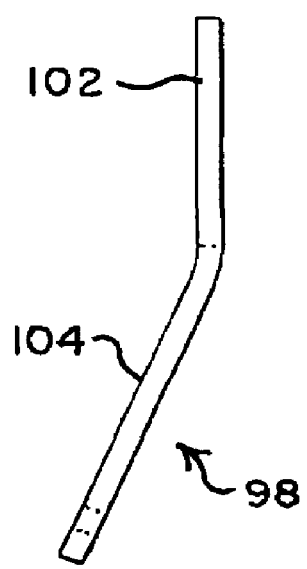
FIG. 10A is an elevation side view of an inner plate of the axle tower shown in 5A
Figure 10B:
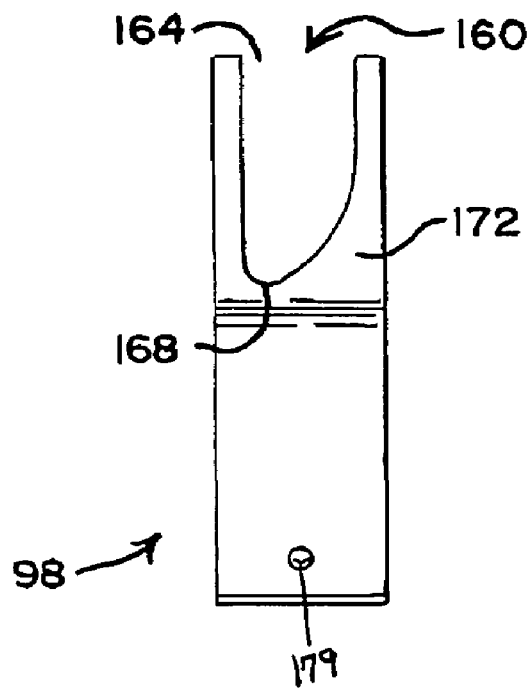
FIG. 10B is an elevation view of the inner plate shown in FIG. 10A rotated 90°.
Figure 11:
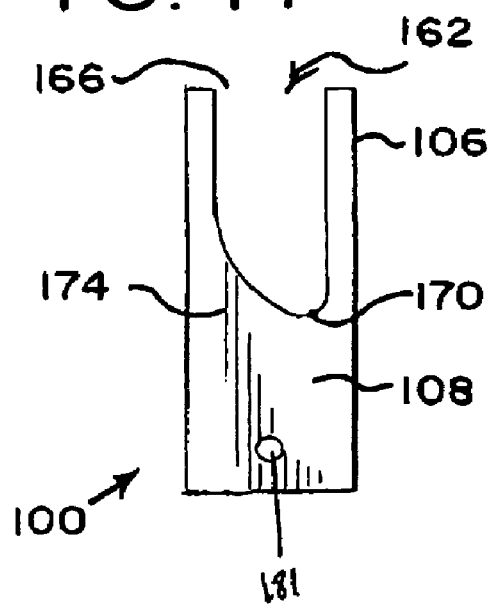
FIG. 11 is an elevation view of an inner plate of the axle tower shown in FIG. 5B.

Inner plate 98 of axle tower 46 shown in FIGS. 10A and 10B has upper and lower portions 102, 104, respectively. The inner plate 100 of axle tower 48 also has upper and lower portions 106, 108 as shown in FIG. 11. The upper and lower portions 102, 104 may be inclined relative to each other and may be at an angle of from about 160° to about 170° In the embodiment shown in FIGS. 10A and 10B upper and lower portions meet a about a 165° angle. This helps to stiffen the area of side plates 58, 62 from the lower portion 104 of inner plate 98 to the end of appendages 68, 72 shown in FIG. 5A. Upper and lower portions 106, 108 can be linearly arranged as shown in FIG. 5B especially since the area of side plates 62, 64 from lower portion 174 of the inner plate 100 to the end of appendages 74, 78.

In order to connect the torque box 42 to axle towers 46, 48, inner plates 98, 100 may include slots 160, 162 (see FIGS. 10 and 11) for accepting the rod 44 as shown in FIGS. 1 and 3. It is understood that a load reacting mechanism/axle alignment device may be connected to the axle towers in other ways known in the art without departing from the scope of the invention.

The forked configuration of upper portions 102, 106 creates slots 160, 162 that are V-shaped and have open ends 164, 166 and closed ends 168, 170. The closed ends 168, 170 of the V-shaped slots 160, 162 may be offset. This creates an area of increased material 172, 174. The inner plates 98, 100 are connected to the side plates 58, 60, 62, 64, respectively so that the increased material is closest to side plates 60, 64 to provided added strength to the side of the inner plate that is under compressive force as shown in FIG. 3. Also, the slots 160, 162 may be the same size and shape so that when the torque box 42 is attached to axle towers 46, 48 the transverse extent of the torque box is maintained in parallel relation to the ground or the axle at rest.

Upper portion 102 of inner plate 98 is attached to the upper portions 82, 86 adjacent edges 136, 140, and the inner plate 98 extends to the base 172 of the axle tower 46. Likewise, upper portion 106 of inner plate 100 is attached to upper portions 90, 94 adjacent edges 144, 148, and the inner plate 100 extends to the base 174 as shown in FIGS. 4A, 4B, 5A and 5B. Due to the placement of axle tower 46 lower on the differential housing 52 and axle tower 48 higher on the differential housing 52, inner plate 98 is longer or taller than inner plate 100. In addition, inner plate 98 is also longer due to the inclined relation of upper portion 102 to lower portion 104. In order to center the torque box over the axle (and between the frame rails) the upper portion of the inner plates, particularly the slots should be equally spaced from the axle centerline.

The axle towers 46, 48 may be welded to each axle housing of axles 26, 28. Welds are made along the bases of each side plates, appendages and inner plates. Since axle towers 46, 48 may be welded to the axle housing and appendages 66, 76 may be weld to appendages 70, 80, respectively, the axle housing and axle tower forms a closed volume that can collect water. Accordingly, as shown in FIGS. 4A and 4B notches 175, 177 may be included in appendages 66, 76, respectively to assist in draining away excess water. In addition, as shown in FIGS. 10B and 11 inner plates 104, 108 may include holes 179, 181, respectively to assist with the drainage of any excess water.

While the present invention has been described in detail with reference to the foregoing embodiments, other changes and modifications may still be made without departing from the spirit or scope of the present invention. It is understood that the present invention is not to be limited by the embodiments described herein. Indeed, the true measure of the scope of the present invention is defined by the appended claims including the full range of equivalents given to each element of each claim.

The invention claimed is:

1. An axle tower for attaching a vehicle suspension component to a vehicle axle having a centerline, the axle tower comprising:

a compression side plate disposed generally parallel to a tension side plate, each of the compression and tension side plates having upper and lower portions, each of the upper and lower portions of the compression and tension side plates having a proximate edge positioned closer to the centerline than a distal edge;

first and second appendages extending from the distal edges of the lower portions of the compression and tension side plates, respectively;

third and fourth appendages extending from the proximate edges of the lower portions of the compression and tension side plates, respectively;

the proximate and distal edges of the lower portions of the compression and tension side plates having an arcuate portion; and an inner plate joining the compression and tension side plates and positioned perpendicular to the compression and tension side plates, the inner plate having upper and lower portions, the upper portion of the inner plate having a slot for attaching the axle tower to the vehicle suspension component.

2. The axle tower of claim 1 wherein the first appendage includes a first section extending from the distal edge along the axle, a second section extending from the first section along the axle and curved toward the tension side plate and a third section extending from the second section along the axle, and the third section is connected to the second appendage adjacent an end thereof and is approximately perpendicular to the first section and the second appendage.

3. The axle tower of claim 2 wherein the arcuate portions of the proximate edges of the compression and tension side plates have substantially equal curvatures, the arcuate portion of the distal edge of the compression side plate is spaced a first distance from the proximate edge of the compression side plate, the arcuate portion of the distal edge of the tension side plate is spaced a second distance from the proximate edge of the tension side plate, and the first distance is less than the second distance.

4. The axle tower of claim 3 wherein the third appendage includes a first section extending from the proximate edge, a second section extending from the first section of the third appendage along the axle and curving toward the tension side plate and a third section extending from the second section of the third appendage along the axle, the third section is connected to the fourth appendage adjacent an end thereof and is approximately perpendicular to the first section of the third appendage and the fourth appendage.

5. The axle tower of claim 3 wherein the upper portion of the inner plate includes a forked end defining the slot, the slot having an open end and a closed end, the closed end disposed closer to the tension side plate than to the compression side plate.

6. The axle tower of claim 5 wherein the upper portion of the inner plate is attached to the compression and tension side plates adjacent the proximate edges of the upper portions of the tension and compression side plates.

7. The axle tower of claim 6 wherein the lower portion of the inner plate is inclined relative to the upper portion.

8. A mounting assembly for mounting a suspension component to an asymmetrical axle including a differential housing having a centerline, the mounting assembly comprising:
  a) first and second axle towers mounted to the asymmetrical axle on opposite sides of the centerline, respectively, the first and second axle towers each comprising:
    i) compression and tension side plates disposed parallel to each other and each of the compression and tension side plates having upper and lower portions, each of the upper and lower portions including a proximate edge facing towards the centerline and a distal edge facing away from the centerline;
    ii) first and second appendages extending from the distal edges of the lower portions of the compression and tension side plates, respectively;
    iii) third and fourth appendages extending from the proximate edges of the lower portions of the compression and tension side plates, respectively; and
    iv) an inner plate joining the compression and tension side plates and positioned perpendicular to the compression and tension side plates, each of the inner plates having a slot for attaching the first and second axle towers to the vehicle suspension component, each of the slots being spaced an equal distance from a center of the axle.

9. The mounting assembly of claim 8 wherein:
  a) each of the proximate edges of the lower portions of the compression and tension side plates of the second axle tower has an arcuate portion, the arcuate portion of the compression side plate of the second axle tower having a radius of curvature equal to a radius of curvature of the arcuate portion of the tension side plate of the second axle tower;
  b) each of the distal edges of the lower portions of the compression and tension side plates has an arcuate portion;
  c) each of the arcuate portions of the compression side plates of the first and second axle towers is spaced a first distance from the proximate edges of the compression side plates of the first and second axle towers, respectively;
  d) each of the arcuate portions of the distal edges of the tension side plates of the first and second axle towers is spaced a second distance from the proximate edges of the tension side plates of the first and second axle towers, respectively; and
  e) the first distance is less than the second distance.

10. The mounting assembly of claim 9 wherein the each of the first appendages of the first and second axle towers includes a first section extending from the distal edge of the lower portion of its respective compression side plate, a second section extending from its respective first section and curving toward its respective second appendage, and a third section extending from its respective second section, and the third section is connected to its respective second appendage adjacent an end thereof, and is approximately perpendicular to its respective first section and its respective second appendage.

11. The mounting assembly of claim 10 wherein the third appendage of the second axle tower includes a first section extending from the proximate edge of the lower portion of the compression side plate of the second axle tower, a second section extending from the first section of the third appendage of the second axle tower and curving toward the tension side plate of the second axle tower and a third section extending from the second section of the third appendage of the second axle tower, the third section of the third appendage is connected to the fourth appendage of the second axle tower adjacent an end thereof and is approximately perpendicular to the first section of the third appendage of the second axle tower and the fourth appendage of the second axle tower, and wherein the third and the four appendages of the first axle tower extend parallel to each other.

12. The mounting assembly of claim 11 wherein each of the inner plates of the first and second axle towers has an upper portion and a lower portion, each of the upper portions include a forked end defining the slot, each of the slots has an open end and a closed end, each of the closed ends are disposed closer to its respective tension side plate than to its respective compression side plate.

13. The mounting assembly of claim 12 wherein each of the upper portions of inner plates is attached to the compression and tension side plates adjacent the proximate edges of the upper portions of the compression and tension side plates, and wherein the slots of the first and second axle towers are spaced equally from a center of the axle.

14. The mounting assembly of claim 13 wherein the lower portion of the inner plate of the first axle tower is inclined relative to the upper portion of the inner plate of the first axle tower.

15. The mounting assembly of claim 14 wherein the first and second appendages of the first axle tower extend a third distance along the axle and the first and second appendages of the second axle tower extend a fourth distance along the axle, the third distance is less than the fourth distance, and wherein the third and fourth appendages of the first axle tower extend a fifth distance along the axle and the third and fourth appendages of the second axle tower extend a sixth distance along the axle, the fifth distance is less than the sixth distance.

16. A suspension system for supporting a vehicle chassis including transversely spaced longitudinally extending first and second frame rails over a transversely extending axle including a centerline, the suspension system comprising:
 a) a cross member extending transversely between and connected to the first and second frame rails;
 b) a multifunctional suspension component connected at one end to the cross member and connected at another end to first and second axle towers; and
 c) the first and second axle towers transversely spaced apart and fixed to the axle at opposite sides of the centerline, the first and second axle towers each comprising:
  i) compression and tension side plates longitudinally spaced from and parallel to each other, each of the compression and tension side plates having upper and lower portions, each of the upper and lower portions having a proximate edge facing towards the centerline and a distal edge facing away from the centerline;
  ii) first and second appendages extending from the distal edges of the lower portions of the compression and tension side plates, respectively;
  iii) third and fourth appendages extending from the proximate edges of the lower portions of the compression and tension side plates, respectively; and
  iv) an inner plate joining the compression and tension side plates and positioned perpendicular to the compression and tension side plates, each of the inner plates having a slot for attaching the first and second axle tower to the multifunctional suspension component, the slots of the first and second axle towers equally spaced from the centerline.

17. The suspension system of claim 16 wherein:
 a) each of the distal edges of the lower portions of the compression and tension side plates has an arcuate portion;
 b) each of the arcuate portions of the compression side plates of the first and second axle towers is spaced a first distance from the proximate edges of the compression side plates of the first and second axle towers, respectively;
 c) each of the arcuate portions of the distal edges of the tension side plates of the first and second axle towers is spaced a second distance from the proximate edges of the tension side plates of the first and second axle towers, respectively; and
 d) the first distance is less than the second distance.

18. The suspension system of claim 17 wherein each of the first appendages of the first and second axle towers include first, second and third sections, each of the first sections extends from its respective distal edges, each of the second sections extends from its respective first sections and curves toward its respective tension side plate, and each of the third sections extends from its respective second section and connects to its respective second appendage adjacent an end thereof and each of the third sections are positioned approximately perpendicular to its respective first section and to its respective second appendage.

19. The suspension system of claim 18 wherein the third appendage of the second axle tower includes a first section extending from the proximate edge of the lower portion of the compression side plate of the second axle tower, a second section extending from the first section of the third appendage of the second axle toward and curving toward the tension side plate of the second axle tower and a third section extending from the second section of the third appendage of the second axle tower, and the third section of the third appendage of the second axle tower is connected to the fourth appendage of the second axle tower adjacent an end thereof and is positioned approximately perpendicular to the first section of third appendage of the second axle tower and to the fourth appendage of the second axle tower.

20. The suspension system of claim 19 wherein:
 a) each of the inner plates has an upper portion and a lower portion, each of the upper portions includes a forked end defining the slot, each of the slots has an open end and a closed end, each of the closed ends is disposed closer its respective tension side plate than to its respective compression side plate; and
 b) each of the upper portions of inner plates of the first and second axle towers is attached to the compression and tension side plates of the first and second axle towers adjacent the proximate edges of the upper portions of the compression and tension side plates.

* * * * *